(12) United States Patent
Wang

(10) Patent No.: US 12,439,829 B2
(45) Date of Patent: Oct. 7, 2025

(54) MAGNETORESISTIVE RANDOM ACCESS MEMORY AND METHOD FOR FABRICATING THE SAME

(71) Applicant: UNITED MICROELECTRONICS CORP., Hsin-Chu (TW)

(72) Inventor: Hui-Lin Wang, Taipei (TW)

(73) Assignee: UNITED MICROELECTRONICS CORP., Hsin-Chu (TW)

(*) Notice: Subject to any disclaimer, the term of this patent is extended or adjusted under 35 U.S.C. 154(b) by 457 days.

(21) Appl. No.: 17/971,651

(22) Filed: Oct. 24, 2022

(65) Prior Publication Data

US 2024/0114803 A1 Apr. 4, 2024

(30) Foreign Application Priority Data

Sep. 23, 2022 (CN) .......................... 202211162585.8

(51) Int. Cl.
| | |
|---|---|
| H10N 50/80 | (2023.01) |
| H10B 61/00 | (2023.01) |
| H10N 50/01 | (2023.01) |
| H10N 50/85 | (2023.01) |

(52) U.S. Cl.
CPC ............. *H10N 50/80* (2023.02); *H10B 61/00* (2023.02); *H10N 50/01* (2023.02); *H10N 50/85* (2023.02)

(58) Field of Classification Search
CPC ........ H10N 50/80; H10N 50/01; H10N 50/10; H10B 61/00; H10B 61/10
See application file for complete search history.

(56) References Cited

U.S. PATENT DOCUMENTS

| | | | |
|---|---|---|---|
| 11,264,557 B2 | 3/2022 | Kardasz et al. | |
| 2006/0132990 A1 | 6/2006 | Morise et al. | |
| 2011/0031569 A1* | 2/2011 | Watts | G01R 33/098 257/E29.323 |
| 2023/0154515 A1* | 5/2023 | Wang | G11C 11/1659 365/158 |

* cited by examiner

Primary Examiner — Wasiul Haider
(74) Attorney, Agent, or Firm — Winston Hsu

(57) ABSTRACT

A method for fabricating semiconductor device includes the step of forming a magnetic tunneling junction (MTJ) on a substrate, in which the MTJ includes a pinned layer on the substrate, a barrier layer on the pinned layer, and a free layer on the barrier layer and the free layer includes a magnesium oxide (MgO) compound. According to an embodiment of the present invention, the free layer includes a first cap layer on the barrier layer, a spacer on the first cap layer, and a second cap layer on the spacer.

18 Claims, 5 Drawing Sheets

MAGNETORESISTIVE RANDOM ACCESS MEMORY AND METHOD FOR FABRICATING THE SAME

BACKGROUND OF THE INVENTION

1. Field of the Invention

The invention relates to a method for fabricating semiconductor device, and more particularly to a method for fabricating a magnetoresistive random access memory (MRAM) device.

2. Description of the Prior Art

Magnetoresistance (MR) effect has been known as a kind of effect caused by altering the resistance of a material through variation of outside magnetic field. The physical definition of such effect is defined as a variation in resistance obtained by dividing a difference in resistance under no magnetic interference by the original resistance. Currently, MR effect has been successfully utilized in production of hard disks thereby having important commercial values. Moreover, the characterization of utilizing GMR materials to generate different resistance under different magnetized states could also be used to fabricate MRAM devices, which typically has the advantage of keeping stored data even when the device is not connected to an electrical source.

The aforementioned MR effect has also been used in magnetic field sensor areas including but not limited to for example electronic compass components used in global positioning system (GPS) of cellular phones for providing information regarding moving location to users. Currently, various magnetic field sensor technologies such as anisotropic magnetoresistance (AMR) sensors, GMR sensors, magnetic tunneling junction (MTJ) sensors have been widely developed in the market. Nevertheless, most of these products still pose numerous shortcomings such as high chip area, high cost, high power consumption, limited sensibility, and easily affected by temperature variation and how to come up with an improved device to resolve these issues has become an important task in this field.

SUMMARY OF THE INVENTION

According to an embodiment of the present invention, a method for fabricating semiconductor device includes the step of forming a magnetic tunneling junction (MTJ) on a substrate, in which the MTJ includes a pinned layer on the substrate, a barrier layer on the pinned layer, and a free layer on the barrier layer and the free layer includes a magnesium oxide (MgO) compound. According to an embodiment of the present invention, the free layer includes a first cap layer on the barrier layer, a spacer on the first cap layer, and a second cap layer on the spacer.

According to another aspect of the present invention, a semiconductor device includes a magnetic tunneling junction (MTJ) on a substrate, in which the MTJ includes a pinned layer on the substrate, a barrier layer on the pinned layer, and a free layer on the barrier layer. Preferably, the free layer includes a magnesium oxide (MgO) compound.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
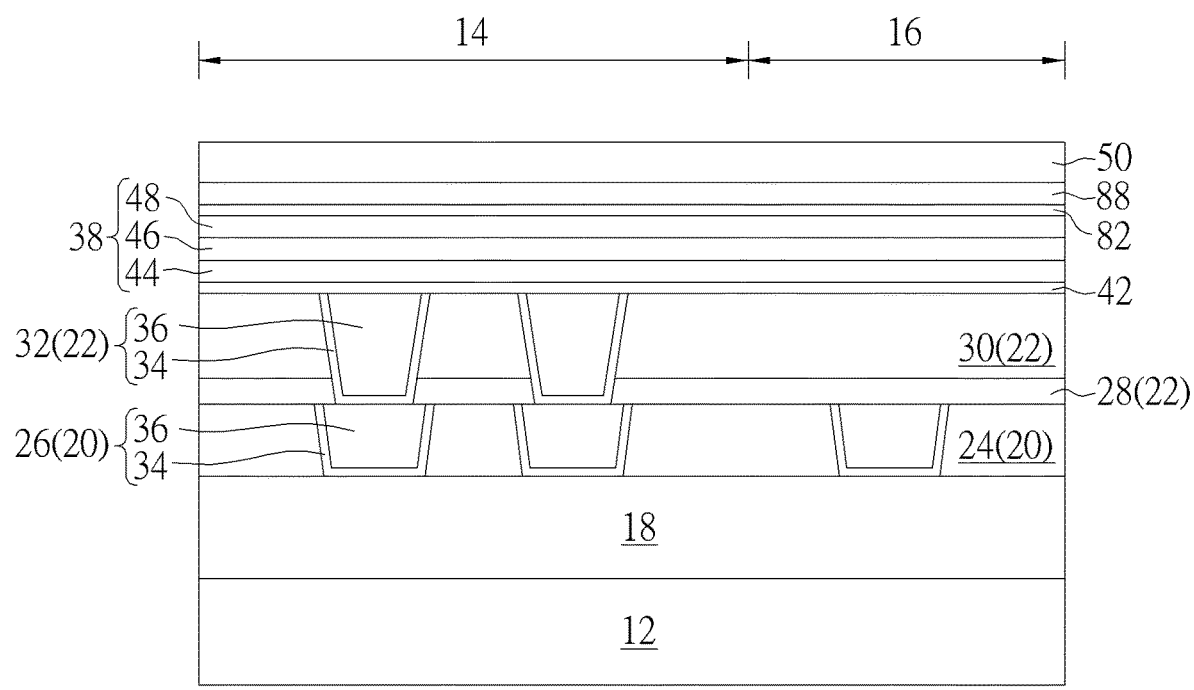
FIGS. 1-8 illustrate a method for fabricating a MRAM device according to an embodiment of the present invention.

Referring to FIGS. 1-8, FIGS. 1-8 illustrate a method for fabricating a MRAM device according to an embodiment of the present invention. As shown in FIG. 1, a substrate 12 made of semiconductor material is first provided, in which the semiconductor material could be selected from the group consisting of silicon (Si), germanium (Ge), Si—Ge compounds, silicon carbide (SiC), and gallium arsenide (GaAs), and a MRAM region 14 and a logic region 16 are defined on the substrate 12.

Active devices such as metal-oxide semiconductor (MOS) transistors, passive devices, conductive layers, and interlayer dielectric (ILD) layer 18 could also be formed on top of the substrate 12. More specifically, planar MOS transistors or non-planar (such as FinFETs) MOS transistors could be formed on the substrate 12, in which the MOS transistors could include transistor elements such as gate structures (for example metal gates) and source/drain region, spacer, epitaxial layer, and contact etch stop layer (CESL). The ILD layer 18 could be formed on the substrate 12 to cover the MOS transistors, and a plurality of contact plugs could be formed in the ILD layer 18 to electrically connect to the gate structure and/or source/drain region of MOS transistors. Since the fabrication of planar or non-planar transistors and ILD layer is well known to those skilled in the art, the details of which are not explained herein for the sake of brevity.

Next, metal interconnect structures 20, 22 are sequentially formed on the ILD layer 18 on the MRAM region 14 and the logic region 16 to electrically connect the aforementioned contact plugs, in which the metal interconnect structure 20 includes an inter-metal dielectric (IMD) layer 24 and metal interconnections 26 embedded in the IMD layer 24, and the metal interconnect structure 22 includes a stop layer 28, an IMD layer 30, and metal interconnections 32 embedded in the stop layer 28 and the IMD layer 30.

In this embodiment, each of the metal interconnections 26 from the metal interconnect structure 20 preferably includes a trench conductor and the metal interconnection 32 from the metal interconnect structure 22 on the MRAM region 14 includes a via conductor. Preferably, each of the metal interconnections 26, 32 from the metal interconnect structures 20, 22 could be embedded within the IMD layers 24, 30 and/or stop layer 28 according to a single damascene process or dual damascene process. For instance, each of the metal interconnections 26, 32 could further include a barrier layer 34 and a metal layer 36, in which the barrier layer 34 could be selected from the group consisting of titanium (Ti), titanium nitride (TiN), tantalum (Ta), and tantalum nitride (TaN) and the metal layer 36 could be selected from the group consisting of tungsten (W), copper (Cu), aluminum (Al), titanium aluminide (TiAl), and cobalt tungsten phosphide (CoWP). Since single damascene process and dual damascene process are well known to those skilled in the art, the details of which are not explained herein for the sake of brevity. In this embodiment, the metal layers 36 in the metal interconnections 26 are preferably made of copper, the metal layer 36 in the metal interconnections 32 are made of tungsten, the IMD layers 24, 30 are preferably made of silicon oxide such as tetraethyl orthosilicate (TEOS), and the stop layer 28 is preferably made of nitrogen doped carbide (NDC), silicon nitride, silicon carbon nitride (SiCN), or combination thereof.

Next, a bottom electrode 42, a MTJ stack 38 or stack structure, a cap layer 82, a cap layer 88, a top electrode 50, and a patterned mask (not shown) are formed on the metal interconnect structure 22. In this embodiment, the formation of the MTJ stack 38 could be accomplished by sequentially depositing a pinned layer 44, a barrier layer 46, and a free layer 48 on the bottom electrode 42. In this embodiment, the bottom electrode 42 and the top electrode 50 are preferably made of conductive material including but not limited to for example Ta, TaN, Pt, Cu, Au, Al, ruthenium (Ru), or combination thereof and more specifically in this embodiment, the bottom electrode 42 is made of TaN while the top electrode is made of ruthenium (Ru). The pinned layer 44 could be made of ferromagnetic material including but not limited to for example iron, cobalt, nickel, or alloys thereof such as cobalt-iron-boron (CoFeB) or cobalt-iron (CoFe). Alternatively, the pinned layer 44 could also be made of antiferromagnetic (AFM) material including but not limited to for example ferromanganese (FeMn), platinum manganese (PtMn), iridium manganese (IrMn), nickel oxide (NiO), or combination thereof, in which the pinned layer 44 is formed to fix or limit the direction of magnetic moment of adjacent layers. The barrier layer 46 could be made of insulating material including but not limited to for example oxides such as aluminum oxide ($AlO_x$) or magnesium oxide (MgO). The free layer 48 could be made of ferromagnetic material including but not limited to for example iron, cobalt, nickel, or alloys thereof such as cobalt-iron-boron (CoFeB), in which the magnetized direction of the free layer 48 could be altered freely depending on the influence of outside magnetic field.

Figure 2:
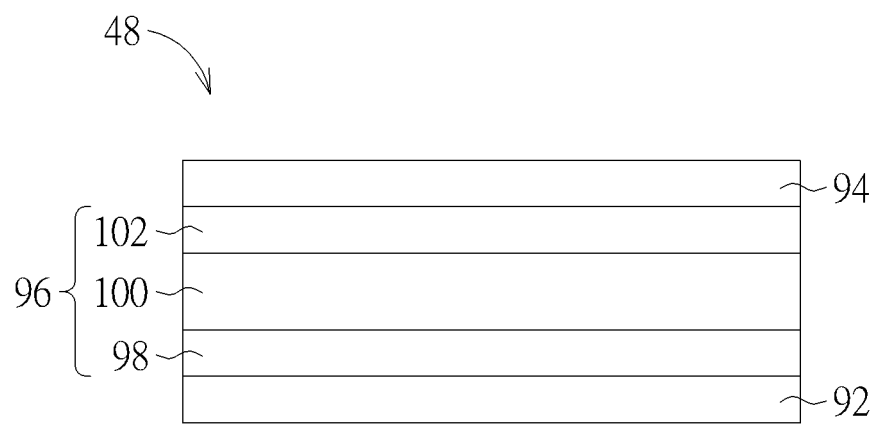

Referring to FIG. 2, FIG. 2 illustrates an enlarged perspective of the free layer 48 according to an embodiment of the present invention. As shown in FIG. 2, the free layer of this embodiment preferably includes two free layers 92, 94 made of ferromagnetic materials and a cap layer 96 made of magnesium oxide (MgO) compound between the two free layers 92, 94.

Specifically, the two free layers 92, 94 are made of CoFeB while the cap layer 96 further includes a first cap layer 98 on the free layer 92, a spacer 100 disposed on the first cap layer 98, and a second cap layer 102 disposed on the spacer 100, in which the first cap layer 98 and the second cap layer 102 are made of metal oxide such as MgO while the spacer 100 is made of metal such as Mg.

In this embodiment, the first cap layer 98 and the second cap player 102 are formed by RF sputtering process while the spacer 100 is formed by a DC sputtering process, and the first cap layer 98 and the second cap layer 102 preferably include same thickness while the thickness of each of the first cap layer 98 and the second cap layer 102 is less than the thickness of the spacer 100. For instance, the thickness ratio between the spacer 100 and the first cap layer 98 is between 3:1 to 5:1 while the thickness ratio between the spacer 100 and the second cap layer 102 is also between 3:1 to 5:1. In other words, the thickness of the spacer 100 is approximately three times to five times the thickness of the first cap layer 98 or the second cap layer 102.

Figure 3:
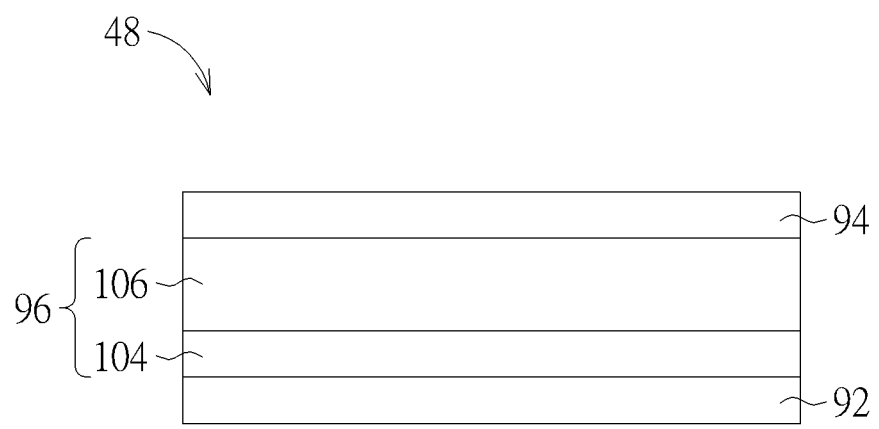

Referring to FIG. 3, FIG. 3 illustrates an enlarged perspective of the free layer 48 according to an embodiment of the present invention. As shown in FIG. 3, in contrast to the cap layer 96 shown in FIG. 2 includes two cap layers 98, 102, the cap layer 96 disposed between two free layers 92, 94 in this embodiment preferably includes a single cap layer 104 disposed on the free layer 92 and a spacer 106 disposed on the cap layer 104, in which the cap layer 104 includes metal oxide such as MgO while the spacer 106 includes metal such as Mg. Similar to the aforementioned embodiment, the thickness of the cap layer 104 is slightly less than the thickness of the spacer 106. For instance, the thickness ratio between the spacer 106 and the cap layer 104 is preferably between 3:1 to 5:1, or the thickness of the spacer 106 is about three times to five times greater than the thickness of the cap layer 104. Moreover, the upper spacer 106 in this embodiment is formed for lowering resistance while the bottom cap layer 104 is formed to prevent oxygen in the lower barrier layer 46 from diffusing upward into the spacer 106 made of Mg.

Figure 4:
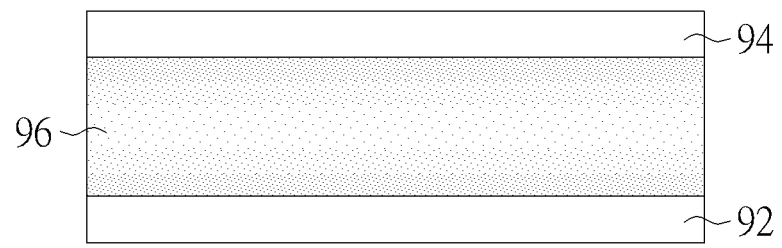

Referring to FIG. 4, FIG. 4 illustrates an enlarged perspective of the free layer 48 according to an embodiment of the present invention. As shown in FIG. 4, the cap layer 96 in this embodiment only includes a single layered structure, in which the cap layer 96 is made of MgO while including a gradient concentration of oxygen. Specifically, the oxygen concentration closer to the bottom surface of the cap layer 96 or the intersection between the cap layer 96 and the lower free layer 92 and the oxygen concentration closer to the top surface of the cap layer 96 or the intersection between the cap layer 96 and the upper free layer 94 are greater than the oxygen concentration closer to the middle portion of the cap layer 96, as shown by the distribution of dots in FIG. 4. In other words, the oxygen concentration in the middle portion of the cap layer 96 is slightly less than the oxygen concentration closer to the bottom surface and top surface of the cap layer 96, in which the oxygen concentration closer to the bottom surface of the cap layer 96 is substantially equal to the oxygen concentration closer to the top surface of the cap layer 96.

Figure 5:
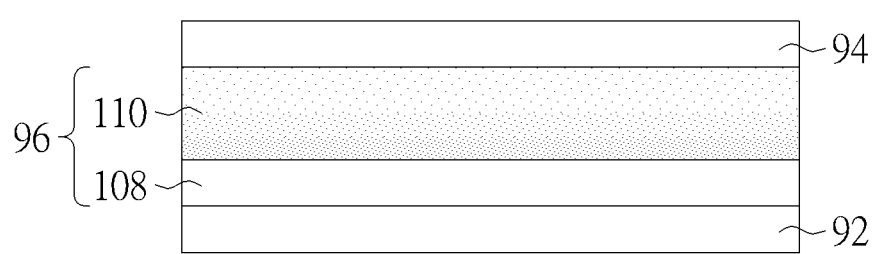

Referring to FIG. 5, FIG. 5 illustrates an enlarged perspective of the free layer 48 according to an embodiment of the present invention. As shown in FIG. 5, the free layer 48 or the cap layer 96 includes a first cap layer 108 disposed on the free layer 92 and a second cap layer 110 disposed on the first cap layer 108, in which the first cap layer 108 and the second cap layer 110 both include metal oxide such as MgO and the first cap layer 108 not including gradient oxygen concentration (meaning the layer 108 includes even distribution of oxygen concentration) while the second cap layer 110 includes gradient oxygen concentration.

It should be noted that in contrast to the oxygen concentration in the middle portion of the cap layer 96 being slightly less than the oxygen concentration closer to the bottom surface and top surface of the cap layer 96 as disclosed in FIG. 4, the oxygen concentration closer to the bottom surface of the second cap layer 110 or the intersection between the second cap layer 110 and the lower first cap layer 108 is greater than the oxygen concentration closer to the top surface of the second cap layer 110 or the intersection between the second cap layer 110 and the upper free layer 94, as shown by the dot distribution in FIG. 5. Moreover, the thickness of the first cap layer 108 is slightly less than the thickness of the second cap layer 110. For instance, the thickness ratio between the second cap layer 110 and the first cap layer 108 is preferably between 3:1 to 5:1 or the overall thickness of the second cap layer 110 is approximately three times to five times the thickness of the first cap layer 108. In this embodiment, the first cap layer 108 is formed to prevent oxygen in the lower barrier layer 46 from diffusing upward into the upper material layers.

Figure 6:
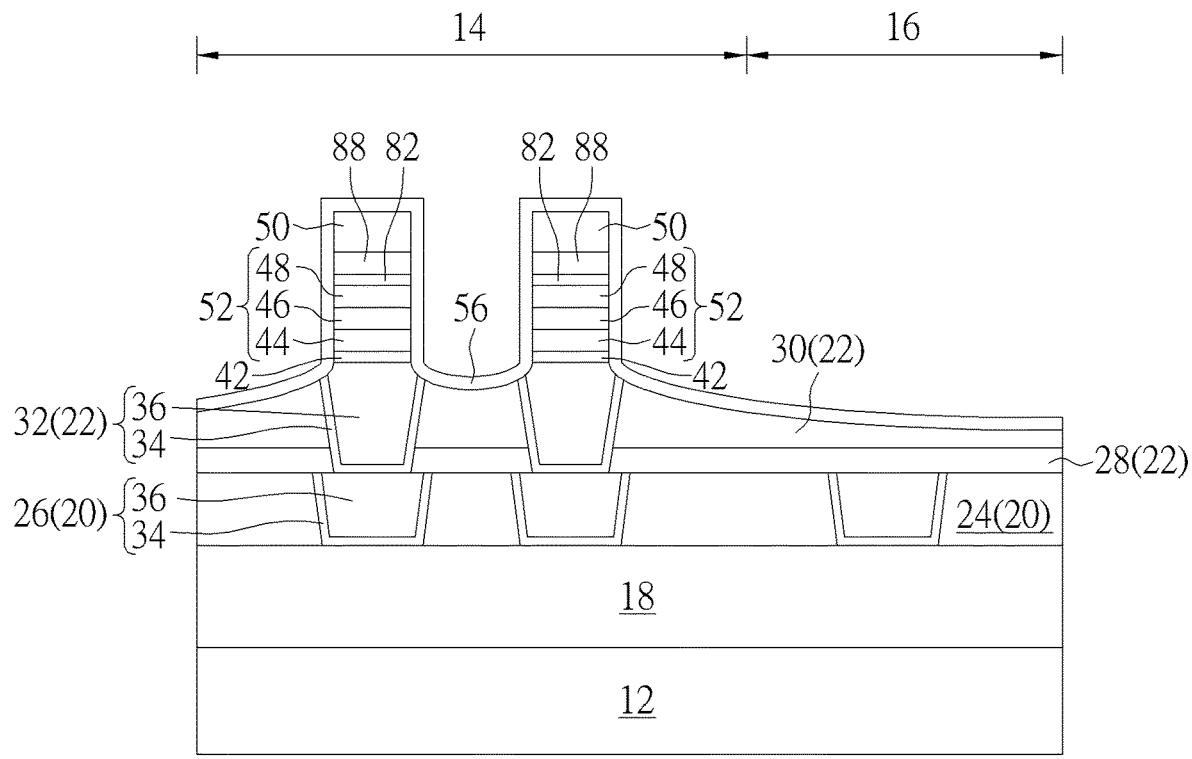

Next, as shown in FIG. 6, one or more etching process is conducted by using the patterned mask as mask to remove part of the top electrode 50, part of the cap layer 88, part of the cap layer 82, part of the MTJ stack 38, part of the bottom electrode 42, and part of the IMD layer 30 to form MTJs 52 on the MRAM region 14. It should be noted that a reactive ion etching (RIE) and/or an ion beam etching (IBE) process is conducted to remove the top electrode 50, cap layers 88, cap layer 82, MTJ stack 38, bottom electrode 42, and the IMD layer 30 in this embodiment for forming the MTJs 52. Due to the characteristics of the IBE process, the top surface of the remaining IMD layer 30 is slightly lower than the top surface of the metal interconnections 32 after the IBE process and the top surface of the IMD layer 30 also reveals a curve or an arc. It should also be noted that as the IBE process is conducted to remove part of the IMD layer 30, part of the metal interconnection 32 is removed at the same time to form inclined sidewalls on the surface of the metal interconnection 32 immediately adjacent to the MTJs 52.

Next, a cap layer 56 is formed on the MTJs 52 and covering the surface of the IMD layer 30. In this embodiment, the cap layer 56 preferably includes silicon nitride, but could also include other dielectric material including but not limited to for example silicon oxide, silicon oxynitride (SiON), or silicon carbon nitride (SiCN).

Figure 7:
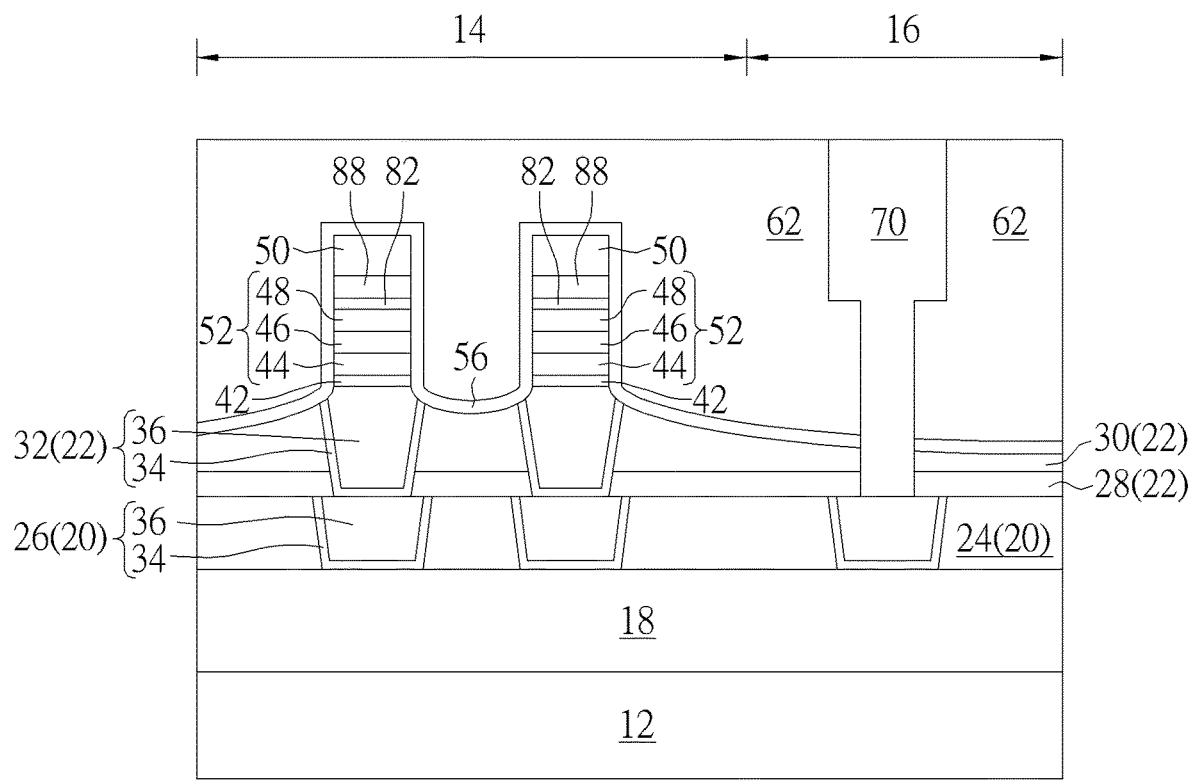

Next, as shown in FIG. 7, a flowable chemical vapor deposition (FCVD) process is conducted to form an inter-metal dielectric (IMD) layer 62 on the passivation layer 58. In this embodiment, the IMD layer 62 preferably include an ultra low-k (ULK) dielectric layer including but not limited to for example porous material or silicon oxycarbide (SiOC) or carbon doped silicon oxide (SiOCH).

Next, a pattern transfer process is conducted by using a patterned mask (not shown) to remove part of the IMD layer 62, part of the cap layer 56, part of the IMD layer 30, and part of the stop layer 28 on the logic region 16 to form a contact hole (not shown) exposing the metal interconnection 26 underneath and conductive materials are deposited into the contact hole afterwards. For instance, a barrier layer selected from the group consisting of titanium (Ti), titanium nitride (TiN), tantalum (Ta), and tantalum nitride (TaN) and metal layer selected from the group consisting of tungsten (W), copper (Cu), aluminum (Al), titanium aluminide (TiAl), and cobalt tungsten phosphide (CoWP) could be deposited into the contact hole, and a planarizing process such as CMP could be conducted to remove part of the conductive materials including the aforementioned barrier layer and metal layer to form a metal interconnection 70 in the contact hole electrically connecting the metal interconnection 26.

Figure 8:
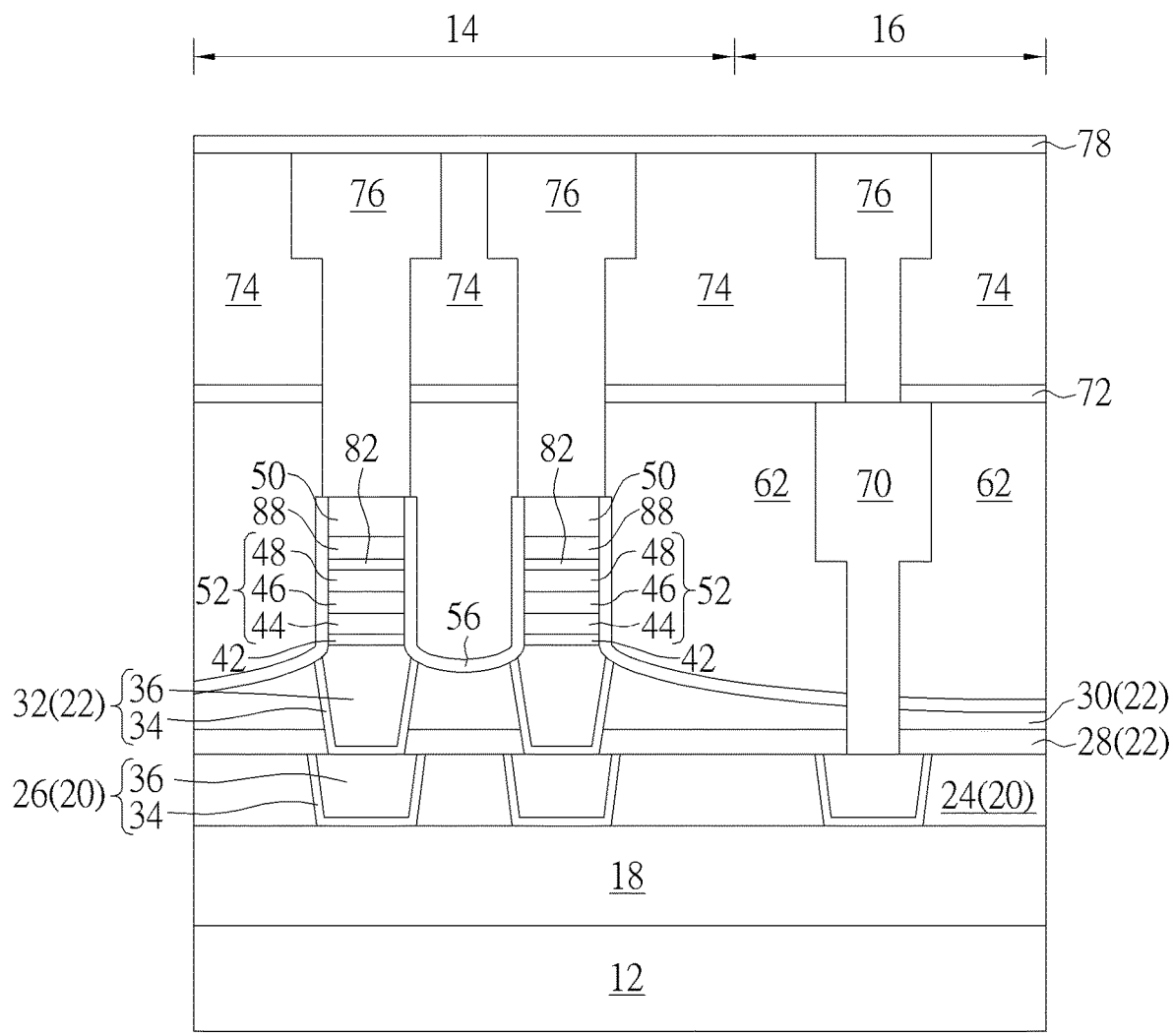

Next, as shown in FIG. 8, a stop layer 72 is formed on the MRAM region 14 and logic region 16 to cover the IMD layer 62 and metal interconnection 70, an IMD layer 74 is formed on the stop layer 72, and one or more photo-etching process is conducted to remove part of the IMD layer 74, part of the stop layer 72, part of the IMD layer 62, and part of the cap layer 56 on the MRAM region 14 and logic region 16 to form contact holes (not shown). Next, conductive materials are deposited into each of the contact holes and a planarizing process such as CMP is conducted to form metal interconnections 76 connecting the MTJs 52 and metal interconnection 70 underneath, in which the metal interconnections 76 on the MRAM region 14 directly contacts the top electrodes 50 underneath while the metal interconnection 76 on the logic region 16 directly contacts the metal interconnection 70 on the lower level. Next, another stop layer 78 is formed on the IMD layer 74 to cover the metal interconnections 76.

In this embodiment, the stop layers 72 and 78 could be made of same or different materials, in which the two layers 72, 78 could all include nitrogen doped carbide (NDC), silicon nitride, silicon carbon nitride (SiCN), or combination thereof. Similar to the metal interconnections formed previously, each of the metal interconnections 76 could be formed in the IMD layer 74 through a single damascene or dual damascene process. For instance, each of the metal interconnections 76 could further include a barrier layer and a metal layer, in which the barrier layer could be selected from the group consisting of titanium (Ti), titanium nitride (TiN), tantalum (Ta), and tantalum nitride (TaN) and the metal layer could be selected from the group consisting of tungsten (W), copper (Cu), aluminum (Al), titanium aluminide (TiAl), and cobalt tungsten phosphide (CoWP). Since single damascene process and dual damascene process are well known to those skilled in the art, the details of which are not explained herein for the sake of brevity. This completes the fabrication of a semiconductor device according to an embodiment of the present invention.

Typically in currently MTJ structure, the composition of free layer is often composed of two free layers made of CoFeB and a cap layer made of Mg between the two free layers. This design however does not effectively prevent oxygen atoms in the lower barrier layer underneath from diffusing upward into the material layers above thereby affecting the performance of the device. To resolve this issue, the present invention preferably forms a cap layer 96 made of MgO compound between two free layers 92, 94, in which the cap layer 96 could be made of MgO and/or a combination of MgO and Mg according to FIGS. 2-5 of the aforementioned embodiments. For instance, the cap layer 96 could be made of a tri-layer structure including a first cap layer 98, a spacer 100, and a second cap layer 102 as shown in FIG. 2, a dual layer structure including a cap layer 104 and a spacer 106 as shown in FIG. 3, a single layered structure having gradient oxygen concentration as shown in FIG. 4, or a dual layer structure including a first cap layer 108 having no gradient oxygen concentration and a second cap layer 110 having gradient oxygen concentration as shown in FIG. 5. According to a preferred embodiment of the present invention, the MgO compound from the aforementioned cap layer could be used to effectively suppress oxygen atoms in the lower level barrier layer from diffusing upward into the upper material layers and ensure the ferromagnetic performance of the MTJ.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for fabricating semiconductor device, comprising:
   forming a magnetic tunneling junction (MTJ) on a substrate, wherein the MTJ comprises:
      a pinned layer on the substrate;
      a barrier layer on the pinned layer; and
      a free layer on the barrier layer, wherein the free layer comprises a magnesium oxide (MgO) compound and the free layer further comprising:
         a first cap layer on the barrier layer;
         a spacer on the first cap layer; and
         a second cap layer on the spacer.
2. The method of claim 1, wherein the first cap layer and the second cap layer comprise MgO.

3. The method of claim 1, wherein the spacer comprises Mg.

4. The method of claim 1, wherein the free layer comprises:
a cap layer on the barrier layer; and
a spacer on the cap layer.

5. The method of claim 4, wherein the cap layer comprises MgO.

6. The method of claim 4, wherein the spacer comprises Mg.

7. The method of claim 1, wherein the free layer comprises a gradient oxygen concentration.

8. The method of claim 1, wherein the free layer comprises:
a first cap layer on the barrier layer; and
a second cap layer on the first cap layer, wherein the first cap layer and the second cap layer comprise MgO.

9. The method of claim 8, wherein the second cap layer comprises a gradient oxygen concentration.

10. A semiconductor device, comprising:
a magnetic tunneling junction (MTJ) on a substrate, wherein the MTJ comprises:
a pinned layer on the substrate;
a barrier layer on the pinned layer; and
a free layer on the barrier layer, wherein the free layer comprises a magnesium oxide (MgO) compound and the free layer further comprising:
a first cap layer on the barrier layer;
a spacer on the first cap layer; and
a second cap layer on the spacer.

11. The semiconductor device of claim 10, wherein the first cap layer and the second cap layer comprise MgO.

12. The semiconductor device of claim 10, wherein the spacer comprises Mg.

13. The semiconductor device of claim 10, wherein the free layer comprises:
a cap layer on the barrier layer; and
a spacer on the first cap layer.

14. The semiconductor device of claim 13, wherein the cap layer comprises MgO.

15. The semiconductor device of claim 13, wherein the spacer comprises Mg.

16. The semiconductor device of claim 10, wherein the free layer comprises a gradient oxygen concentration.

17. The semiconductor device of claim 10, wherein the free layer comprises:
a first cap layer on the barrier layer; and
a second cap layer on the first cap layer, wherein the first cap layer and the second cap layer comprise MgO.

18. The semiconductor device of claim 17, wherein the second cap layer comprises a gradient oxygen concentration.

* * * * *